Figure 3A:
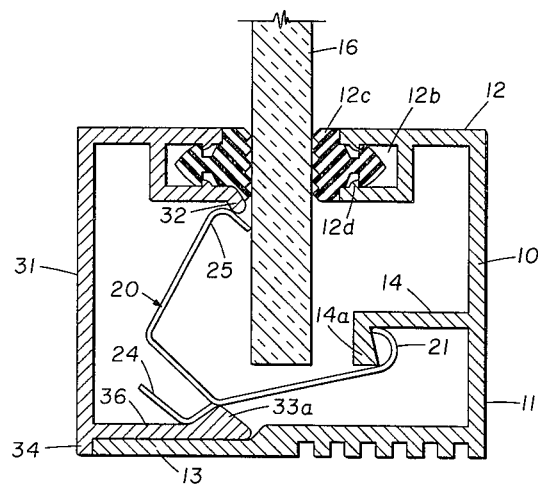

March 29, 1966     J. L. FOUNTAIN     3,242,627
GLAZING FRAME ASSEMBLY
Filed Dec. 14, 1962     3 Sheets-Sheet 1
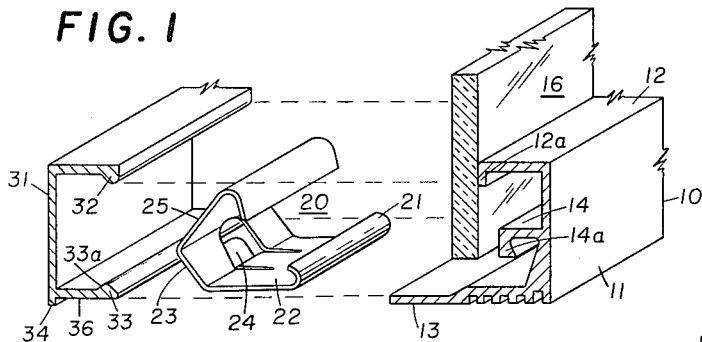
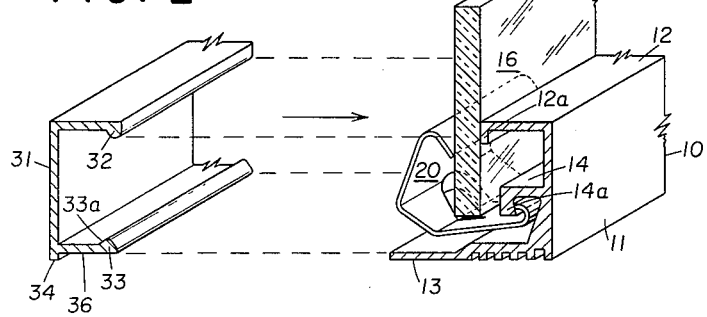
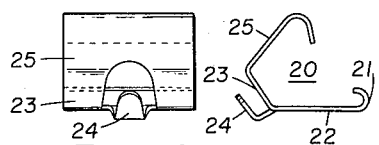
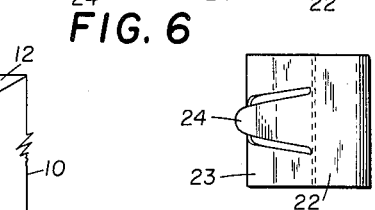
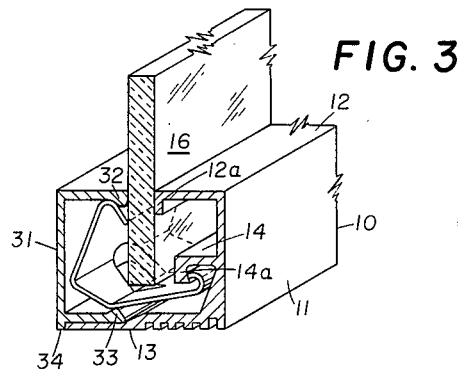
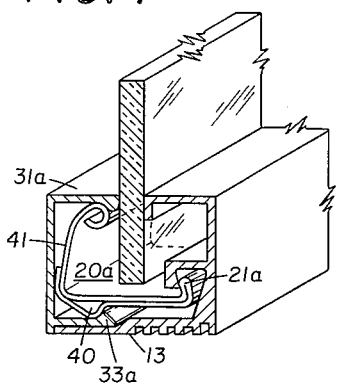
JAMES L. FOUNTAIN
INVENTOR.

March 29, 1966 J. L. FOUNTAIN 3,242,627
GLAZING FRAME ASSEMBLY

Filed Dec. 14, 1962 3 Sheets-Sheet 2

JAMES L. FOUNTAIN
INVENTOR.

BY D. Carl Richards

ATTORNEY

JAMES L. FOUNTAIN
*INVENTOR.*

United States Patent Office 3,242,627
Patented Mar. 29, 1966

3,242,627
GLAZING FRAME ASSEMBLY
James L. Fountain, 8911 Westglen Drive, Dallas, Tex.
Filed Dec. 14, 1962, Ser. No. 245,366
10 Claims. (Cl. 52—494)

This invention relates to structural units of the type in which panels are mounted in frame members. More specifically, the invention relates to a system employing a spring clip for maintaining a panel unit and trim in a frame.

This application is a continuation-in-part of application Serial No. 3,057, filed January 18, 1960, now abandoned.

Glazed structures such as windows, doors, and other openings in frame work which are finished with panels of transparent, opaque, or translucent material mounted therein and supported at the marginal edges thereof, have long been employed in construction operations. With the availability of extruded metal trim materials, there has been developed various framing systems for fabrication of structural units. The present invention is directed towards an arrangement of basic structural units and the provision of a mounting structure for panel units which may be assembled by mere clips having snap action to provide a complete facing assembly without the necessity of the use of fastening members such as screws and bolts more commonly employed in the building arts.

More particularly in accordance with the present invention, there is provided a frame ssaembly in which a first frame element is provided with an inwardly depending flange. A structural plate is provided which is positioned adjacent the flange. A spring clip is adapted to be attached to the flange and is stressed by engaging the face of the plate on the face thereof opposite the flange and by engaging the frame element.

In a preferred embodiment the frame element is a metallic extrusion having a continuous channel-shaped flange with a hook rib positioned inside the channel portion of the flange for attachment with the spring clip.

In accordance with a further aspect of the invention, a second frame element, in the form of a channel having ribbed extremities, is provided to encompass the spring clip and serve to transmit spring clip developed forces to the structural plate and to the first frame element.

In accordance with a further aspect of the invention, oppositely directed flanges associated with a central bar form the main frame element. Structural plates such as glass or enameled panels then are disposed adjacent the flanges on opposite sides of the central bar. Spring clips then are secured to the flanges and looped over the respective edges of the plates and are stressed by bearing against opposite sides of the central bar and on the faces of the plates opposite the flanges. A cover element, the second frame element, then is provided to span the central bar and to be locked in engagement with the faces of the plates opposite the flanges by connection with the spring clip.

More particularly in accordance with the present invention, there is provided a structure forming a part of a building unit for mounting a structural panel in which there is provided a sill having a first surface against which the marginal edge of a structural panel may rest. Structure is then provided having a second surface which is oriented perpendicular to said first surface. A rib structure on the sill forming a hook portion facing away from the first surface is provided for cooperation with a spring clip which is adapted at one end to engage the hook portion of the rib with an external midportion of the spring bearing against the second of the surfaces with the other extremity of the spring in proximity to the first surface for urging a structural plate against the first surface. Preferably, the spring clip is of arcuate form having an outwardly depending tongue extending downwardly and away from said second surface. A molding element, adapted to encompass the clip and engage the second surface, is provided with an elongated rib portion whose upper surface configuration corresponds with the downwardly and outwardly extending configuration of the clip tongue.

Figure 8A:
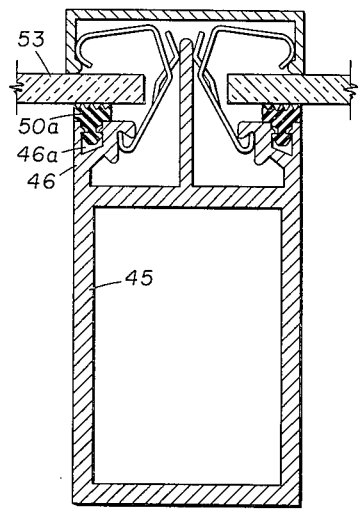
Figure 8:
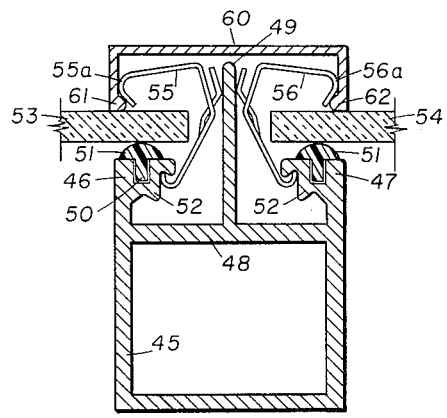
Figure 9:
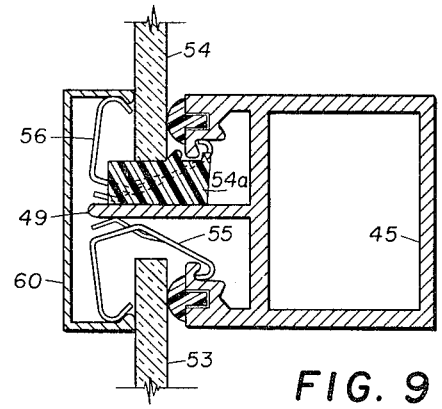
Figure 11:
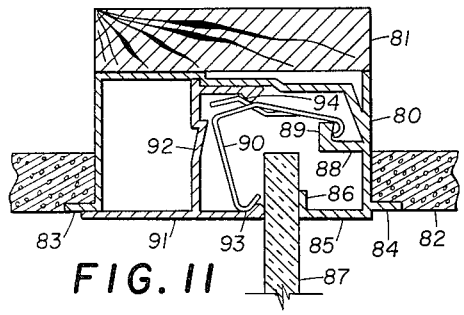
Figure 10:
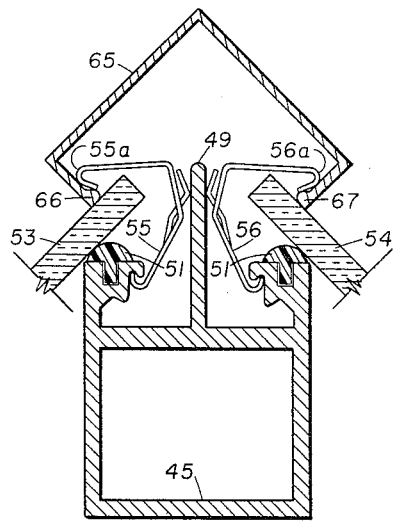
Figure 12:
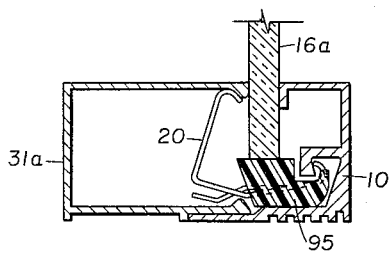

For further objects and advantages of the invention, reference may now be had to the following description taken in conjunction with the accompanying drawings in which:

FIGURE 1 is an exploded sectional view of a sash and a window pane;
FIGURE 2 is a partially assembled view of the unit of FIGURE 1;
FIGURE 3 is a completely assembled view of the system of FIGURE 1;
FIGURE 3A is a modification of the unit of FIGURE 3;
FIGURE 4 is an end view of the clip of FIGURE 1;
FIGURE 5 is a bottom view of the clip of FIGURE 1;
FIGURE 6 is a back view of the clip of FIGURE 1;
FIGURE 7 is a side view of an assembled unit employing a modification of the clip;
FIGURE 8 is a sectional view of a vertically oriented division bar structure as positioned at the mid-section of a glazed wall;
FIGURE 8A is a modification of the system of FIGURE 8;
FIGURE 9 is a sectional view of a horizontally oriented division bar unit;
FIGURE 10 is a sectional view of a division bar employed as a corner element in a glazed wall;
FIGURE 11 illustrates a recessed sash structure; and
FIGURE 12 illustrates the sash of FIGURES 1–3 with a wide face channel.

In FIGURES 1–3, one embodiment of the present invention, a frame assembly for mounting a window pane, has been illustrated. The assembly is exploded in FIGURE 1, partially assembled in FIGURE 2, and fully assembled in FIGURE 3. More particularly, the back half of a sash 10 comprises a frame element having an inwardly directed flange. The sash 10 is an elongated extrusion having a back 11, a main glazing rib 12a depending from the extremity of flange 12, and a base 13. The portion of the base adjacent to the back 11 is fluted or ribbed to receive caulking compound and/or to receive a positioning rib, as will hereinafter be described. Midway along the height of the back 11, there depends an elongated rib 14 which extends parallel to the flange 12 and is provided with a lip 14a along the lower edge thereof. Lip 14a forms a hook-like portion which faces away from the glazing rib 12a of the flange 12. The rib 12a has a surface against which plate 16 rests.

A spring clip 20 is provided with a hook 21 at one extremity thereof which is adapted to engage the rib 14, interlocking the same. The base 22 of the spring and the ascending portion 23 are perforated to form a tongue 24 therein, extending away from the hook 21 and then downwardly below the lower face of the base 22. The bearing portion or end 25 of the clip 20 has a curved end extending upward from base 22 to a height approximately equal to the height of the face of rib 12a above the base 13 of the sash 10.

As illustrated in FIGURE 2, the clip engages the rib 14 and may be forced into such engagement after the plate 16 has been positioned adjacent to the surface of rib 12a. In this position, the tongue 24 and the base portion 22 engage the inner surface of the base 13 of sash 10. The spring clip 20 has bearing portion 25 at the upper end thereof which transmits a pressure on the plate 16 in the direction of the arrow to maintain the plate 16 against the surface of rib 12a. Clip 20 is stressed by bearing against base 13 while end 21 is hooked onto the lip 14a and end 25 bears against plate 16.

As illustrated in FIGURE 3, the front face section is in the form of a channel 31 having two flanges. The extremity of each flange of channel 31 is provided with a rib such as the circular rib 32 along the inside of the upper flange and triangular rib 33 extending along the inside of the lower flange. A lip 34 forming an extension of the back of channel 31, extends beyond the lower flange a distance equal to the thickness of the base 13 of sash 10. As illustrated in FIGURE 3, completion of assembly involves snapping the channel 31 into engagement with the spring clip 20 at two points. The first point of contact between the spring clip 20 and the channel 31 is the tongue 24 engaging the inner surface 33a of the triangular rib 33. The second point of contact between the channel 31 and the spring clip 20 is the engagement between the inner surface of the rib 32 on the upper edge of the channel 31 and the outside surface of the bearing end 25 of the spring clip 20. The surface 36 of the lower flange of channel 31 rests on the inner surface of the base 13 of sash 10. The rib 34 serves to cover the edge of the base 13 of sash 10.

Not only does the rib 34 provide an uninterrupted finish on the outside sill installation, but also serves as a gauging stop for the channel 31 so that the spring clip 20 engaging the rib 33 forces the channel 31 to the right as viewed in FIGURE 3 to maintain a fixed positional relationship between the sash 10 and the channel 31. The length of the lower surface 36 is such that the tongue of the spring clip 20 will be maintained with the base of the tongue 24 in contact with the top of the rib 33 and with the downward and outward extending portion of the tongue as viewed in FIGURE 4 in contact with the sloping side 33a of the rib 33. This relationship is best shown in FIGURE 3A.

In practice, a frame comprising the inside or back sash 10 may be mounted by any suitable means in an opening to be glazed. Once in position, the panel adapted to close the opening is placed in position against the surface of rib 12a of flange 12. A plurality of clips such as clip 20 are then looped over the edge of plate 16 and in one motion snapped into position engaging the lip 14a at intervals such as may be necessary to maintain the plate in place. In practice it has been found desirable to space the clips at intervals of the order of ten inches to one foot. After the clips have been snapped into position, the second frame element, the front face channel 31, may be snapped into engagement with the spring clip 20, forming a completely closed trim around the periphery of plate 16. The entire operation may be completed without the use of any tool, the locking operation being completed merely by snapping spring clips into engagement with the back sash and then snapping the front face channel onto the spring clips. The channel 31 serves to further stress the spring clips and transmit force from the spring clips to the surface of the plate 16. By this means a closed joint is maintained between the channel 31 and the face of the plate 16.

The cooperation between the sash, the spring clip 20 and the channel 31 is more clearly illustrated in FIGURE 3A where like parts have been given the same reference characters as in FIGURE 3. In this modification, the upper flange 12 is provided with a channeled section 12b into which there is fitted a rubber gasket 12c. A pair of ribs, such as rib 12d, are located on opposite sides of the channel 12b and serve as a detent for the gasket 12c. Gasket 12c has a bayonet-type ridge extending away from the glass plate 16. The surface of the gasket 12c is ribbed to provide for contact with the surface of the glass plate 16. The lower surface of the sash is ribbed to provide a plurality of indentations or grooves which may fit over a positioning member so that the sash element 10 will be fixed in dependence upon the engagement between the rib section and a positioning member.

The clip 20 with the tongue 24 is shaped to conform with the shape of the upper surface 33a of the rib 33. Thus, when the clip hook 21 engages the lip 14a and the end 25 engages the glass plate 16, the front face channel 31 may be slipped into place with the tongue 24 riding up over the surface 33a and the rib 32 riding over the end 25. The configuration of the tongue 24 corresponds with the surface 33a. A secure latch is thus provided. This arises by reason of the fact that when in final position the upper edge or the point of the rib 33 engages the spring clip 20 at the base of the tongue 24 so that a substantial force is necessary to disengage the sash section 31 from its clipped position. This is in contrast with prior devices in which the tongue section does not correspond in configuration with the surface of the cooperation rib. At the same time, the tongue 24 is sufficiently resilient that the sash section may be inserted with relative ease. The particular configuration of clip and sash section as illustrated in FIGURE 3A has been found to be superior in actual practice to prior art systems.

Thus there is provided a structural system for mounting plates in which there is sash structure 10 having a back 11 carrying an abutment rib 12a presenting a first surface against which the structural plate 16 may rest. Base 13 forming a second surface perpendicular to the back 11 is displaced laterally from the rib 12a and beyond the periphery of the glass plate 16. A lip 14a extends the length of the structure 10 forming a hook portion which faces away from the surface of rib 12a or in a direction opposite the surface of rib 12a. The spring 20 is adapted at end 21 to engage the hook portion of the lip 14a with the outside or external portion 24 of the spring bearing against the surface of base 13, and the other extremity 25 of the clip 20 is positioned in proximity to surface of rib 12a, thereby to urge the plate 16 against rib 12a.

When necessary, the glass may be removed by inserting a sharp, thin instrument along the plane of the glass plate 16 under the edge 32 where pull outwardly releases channel 31 from clip 20. Pressure then applied to the inside surface of the bottom portion 22 of each spring clip will release the hook 21 from engagement with the lip 14a so that the spring clip can be removed, freeing the glass plate 16.

Thus, in one aspect of the invention, there is provided the combination of a sash and a spring clip. In a further aspect of the invention, there is provided a combination of sash, spring clip, and face element, the three elements combining to form a finished structural unit for mounting a structural plate.

The spring clip of FIGURE 1 has been illustrated in further detail in FIGURES 4, 5 and 6. FIGURE 4 is an end view of the clip and illustrates the relative proportions of the clip in unflexed condition. It is to be noted that dimensions of the clip may be varied to accommodate plates of substantially different thickness where necessary.

The bottom view of FIGURE 5 illustrates the configuration of the tongue 24, the latter being integral with a central portion of the clip 20.

FIGURE 6, a back view of the clip, shows the relative proportions of the tongue and spring sections. In practice, it has been found desirable and wholly satisfactorily to form the spring clip from spring steel stock of approximately .024-inch thickness. The clips were made to be approximately one inch in width and are suitably coated to prevent chemical interaction with the metal forming the associated frame element.

In these embodiments of the invention where the completed unit of FIGURE 3 forms a vertical mullion, the arrangement may be as shown in FIGURE 3. Where the structure forms a horizontal jamb supporting a glass plate, a setting block of neoprene rubber is provided at each of the edges of plate 16 to support the plate and maintain it in a spaced relationship above the bottom 13 of the sash 10. Setting blocks such as hereinafter described permit ready insertion of the spring clips 20 around the bottom jamb by supporting the glass above the base 13.

Referring now to FIGURE 7, there is illustrated a modification of the clip. In this modification, the spring 20a is formed of stock which is folded abruptly at the hook end 21a and bent back parallel to the body portion of the clip to form a foot 40 which is adapted to bear against a surface such as the base 13 of the extrusion 10. Further, the folded portion extends up along the back 41 of the spring clip to provide increased forces and also to form a recess or indentation which engages the triangular rib 33a of the front plate 31a.

Referring now to FIGURE 8, a division bar is illustrated as a vertical division bar for use at a mid-point in a glazed wall. The division bar 45 having a rectangular back section is provided with a pair of peripheral ribs or side extensions 46 and 47, which extend beyond the limits of the rectangular portion 45. The side 48 of the rectangular portion 45 has a central bar or rib 49 extending therefrom to a distance substantially beyond the ends of the ribs 46 and 47. Ribs 46 and 47 are each provided with surface grooves, such as groove 50, adapted to receive rubber stops such as stop 51. Stop 51 preferably has a cylindrical surface. The rib 46, is, therefore, substantially thicker at its extremity than at the point of connection to the rectangular portion 45. A hook section 52 is provided along the inside of each of the channel-shaped structures formed by the extremities 46 and one side of portion 48. The hook section 52 faces away from the surface of the rubber stop 51. Window lights 53 and 54 are therefore adapted to rest against, or be supported by, the rubber stops 51. Spring clips 55 and 56, registering with hook sections 52 and bearing against the bar 49, contact the surfaces of the window lights 53 and 54 on the sides thereof opposite the rubber stops 51. By this means the plates 53 and 54 are resiliently urged against the stops 51. A face channel 60, having identical ribbed flanges 61 and 62, is adapted to snap onto the structure engaging the extremities 55a and 56a of springs 55 and 56, respectively. Thus, it becomes exceeding simple to glaze a wall where the mullions and jambs are formed of division bar structure such as shown in FIGURE 8.

Division bar 45 has been illustrated in FIGURE 9 as a horizontal element in a glazed wall. Where consistant, like parts have been given the same reference character as in FIGURE 8. In this case the plate glass panes 53 and 54 are disposed in a vertical plane with the pane 54 above pane 53. The bottom pane 53 is secured to division bar 45 through operation of clip 55 and the face channel 60 in the same manner as in FIGURE 8. However, the upper pane 54 rests on a setting block 54a which may be of hardened rubber or other similar material. Setting blocks such as blocks 54a are positioned under the edge of pane 54 at, or adjacent, each of the lower corners thereof to maintain the bottom of pane 54 away above bar 49. By this means a space is provided for insertion of the clip 56 which serves to lock the pane 54 to the division bar 45. Setting blocks such as illustrated in FIGURE 9 preferably will be one-half foot to one foot in length, depending, of course, upon the size of the opening and the desired space between adjacent clips such as clip 56.

The division bar 45 may also be employed to support and finish a corner in a glazed wall in the manner illustrated in FIGURE 10. In this embodiment, panes 53 and 54 form elements of wall sections, the planes of which are perpendicular. However, the same structural relationships apply as in FIGURE 8 with the exception that the rib 49 initially is oriented at a 45° angle with respect to the planes to be occupied by the glass panes 53 and 54. The plane of rib 49 passes through the intersections of the planes of the sheets 53 and 54. A rectangular corner member 65 in the form of an angularly truncated rectangular tube is then provided having enlarged ribs 66 and 67, which ribs engage the extremities 55a and 56a of clips 55 and 56, respectively, to exert pressure on the panes 53 and 54 urging them against the rubber stops 51 and at the same time providing a neat finish trim which is positively secured. No connections or other mechanical contrivances other than the springs 55 and 56 are necessary for the complete assembly.

In the embodiment illustrated in FIGURE 8A, a fluted gasket 50a has been employed wherein the bayonet-shaped, rearwardly extending rib is secured in the groove 46a in channel 46 to provide a more certain sealing arrangement with respect to the glass pane panel 53. In this embodiment, the section 45 is substantially deeper than that shown in FIGURE 8, but in other respects is similar to FIGURE 8 with the locking ribs on the gasket receiving channel being similar to those shown in FIGURE 3A.

It will be readily appreciated that the facility with which units may be thus assembled greatly may reduce the cost of the on-the-job operations. All structural features of the systems thus devised may be completed in a central shop where mass production techniques may be employed. The operations at a construction site where tools and facilities are not always the most convenient are reduced to a minimum.

In FIGURE 11 there has been illustrated a sectional view of a recessed sash provided with clips and locking means of the type above described. In this unit the recessed sash element 80 is mounted on and secured to a furring block 81 which is located either in the ceiling or on a vertical wall at an opening to be glazed. The surface 82 of the wall or ceiling, as the case may be, may be finished flush with the surface of flanges 83 and 84. The back of the recessed sash 80 has a flange 85 with an upturned end 86 against which the glass pane 87 may rest. A second flange 88 with an upturned hook portion 89 is adapted to receive the end of clip 90. The face unit 91 is of sufficient width as to extend from the surface of the pane 87 onto the surface of flange 83. The face portion 91 forms with the upturned portion 92 a channel element which is adapted to engage the clip 90 at points 93 and 94, thereby to complete the installation. Such a recessed sash unit may be employed either on walls or ceilings and in combination with sash sections such as shown in FIGURE 1 or division bar units such as shown in FIGURE 8.

In FIGURE 12 there has been illustrated a wide face sash which corresponds with the sash of FIGURE 1 except that the face channel 31a is substantially wider than channel 31 of FIGURE 1. In other respects, the construction is the same as in FIGURE 1. The back 11 of the sash 10 and the operation of the clip 20 are identical with those of FIGURE 1. FIGURE 12 illustrates the use of a setting block such as block 95 which will be found desirable where large panes of glass are mounted in order to maintain clearance between the bottom of pane 16a and the bottom surface of the sash 10. The setting block 95 is so formed to hook onto rib 14 and thus fix it in position to receive the pane 16a.

The spring clip 20 of FIGURES 4–6 may be varied in dimensions and properties to develop the necessary forces and to be compatible with the associated framing elements. The forces developed on the face of glass pane 16, FIGURE 1, should be adequate to withstand wind forces and the like. At the same time, the framing element 10 must be able to serve as an anchor for the spring clip 20 without deformation under the forces developed thereby.

The spring clip 20 is provided with the base 22 which has one end abruptly curved to form hook portion 21 extending along the entire width thereof. The tip of the hook lies in a plane parallel to that of the bottom 22. The back or ascending portion of spring 20 is, in a preferred embodiment, formed of two planar areas, the area 23 and area 25. The tongue 24 is formed centrally of the spring from the base 22 and the portion 23 and forms a resilient detent extending below the plane of the base 22. The upper edge of the portion 25 is rolled to form a sliding surface which will readily accommodate the channel 31 and will provide a locking engagement with the rib 32 of channel 31. It will be recognized that the spring clip 20 may be more smoothly arcuate in shape than the angularly formed clips shown in the drawing and still provide for attachment at one end to the first frame element while developing forces against the face of the glass pane 16 and the base 13 of the element 10.

The clip therefore forms the fastening element in a system for sealing an opening which has a sash, such as sash 10, FIGURE 3A, for supporting the glass plate 16 of FIGURE 3. The sash 10 is provided with a sash strip hook or lip 14a and has a fluted base 13 which has a surface perpendicular to the plane of the glass plate 16 which is planar on the portion thereof opposite the sash strip hook 14a. The base 13 extends a predetermined distance beyond the plane of the glass plate 16 to a stop-line corresponding with the inner face of the facing channel 31. The clip 20 extends approximately 270° around the arc generally described thereby and, in the form shown, has a width approximately equal the diameter of such arc. The clip as an article of manufacture may thus have varied characteristics within the scope of the invention.

Preferably, the spring clip of arcuate form has rolled hook-shaped ends one of which, the end 21, engages the sash strip hook 14a and the other end of which, the end 25, bears against the surface of the plate 16 opposite the sash hook 14a. The clip 20 has the resilient tongue 24 formed from an intermediate portion of the clip strap, such that it extends to the base flange 13 at a point a predetermined distance from the front or stop-line of the sash base flange 13. The tongue 24 then extends away from the sash base flange 13 approximately parallel to the perimeter of the body of the clip in a direction away from the end 21. The facing channel 31 preferably is provided with an inset base side flange 36 which is terminated in the wedge-shaped tip 33a. Flange 36 is of length such that the peak of the rib or tip 33a corresponds with the location of the base of the tongue 24 when the edge of the sash base flange 13 bears against and is thus covered by the inner surface of the facing channel 31. The facing channel 31 is also provided with the upper or finish side flange which has a tip 32 directed downward towards the sash base 13 and is provided with a resilient sealing strip of the same character as the sealing strip 12c. Tip 32 engages the end 25 of the clip 20 to maintain the sealing strip in intimate engagement with the surface of the plate 16.

From the foregoing, it will be seen that there has been provided a glazing structure which involves a hook adjacent to but facing away from the inner surface of the periphery of a panel to be glazed, with a bearing element extending from said hook past the edge of the panel. A mounting clip is provided with a hook on one end to receive the hook portion of the mounting structure and to resiliently urge the panel against the hook portion. A finish element is provided for engaging the clip at the outside face of the panel to provide a resilient retentive force on both the face element and the panel.

While the invention has been described in connection with certain embodiments thereof, it is to be understood that modifications therein may now suggest themselves to those skilled in the art, and it is intended to cover such modifications as fall within the scope of the appended claims.

What is claimed is:
1. A division bar construction for supporting a pair of thin plates such as window glass and the like which comprises:
  (a) an inner member having a central web and a pair of flanges with inwardly directed hooks on confronting faces of said flanges with the extremities of said flanges supporting the inner faces of said plates, said inner member having a central rib extending outwardly from said web to a line beyond the extremities of said flanges,
  (b) a first arcuate spring clip engaging at one end a first of said hooks and looped around the edge of a first of said plates with the outer surface of said clip bearing against one face of said central rib and extending at the other end to the face of said first of said plates opposite one of said flanges,
  (c) a second arcuate spring clip engaging at one end a second of said hooks and looped around the edge of a second of said plates with the outer surface of said second clip bearing against a second face of said central rib and extending at the other end to the face of said second of said plates opposite a second of said flanges, and
  (d) a channel member having a pair of flanges the extremities engaging the other end of both clips and the surfaces of said plates.

2. A division bar construction for supporting a pair of thin plates such as window glass and the like which comprises:
  (a) an inner member having a central web and a pair of flanges with inwardly directed hooks on confronting faces of said flanges, the extremities of said flanges supporting the inner angularly disposed faces of said plates, said inner member having a central rib extending outwardly from said web to a line beyond the extremities of said flanges,
  (b) a first arcuate spring clip having rolled ends, one of which is directed inwardly to engage a first of said hooks when looped around the edge of a first of said plates with the outer surface of said first clip bearing against one face of said central rib and extending at the other end to the face of said first of said plates opposite a first one of said flanges,
  (c) a second arcuate spring clip having rolled ends, one of which is directed inwardly to engage a second of said hooks when looped around the edge of a second of said plates with the outer surface of said second clip bearing against another face of said central rib and extending at the other end to the face of said second of said plates opposite the second of said flanges, and
  (d) a corner truncated rectangular tube the extremities of which are adapted to engage said other ends of both clips and the surfaces of said plates.

3. A supporting structure for a pair of plates such as window glass which comprises:
  (a) a rigid bar having at least one planar face,
  (b) a central flange extending longitudinally of said bar from a median line on said face,
  (c) a pair of opposed marginal flanges with inwardly directed hooks extending from said face parallel to said central flange with the extremities of said marginal flanges supporting the inner faces of said plates, said central flange extending outwardly from said face beyond the extremities of said marginal flanges,
  (d) a first arcuate spring clip engaging at one end a first of said hooks and looped around an edge of the first of said plates with the outer surface of said clip bearing against one face of said central flange and extending at the other end to the face of said first of said plates to confront one of said marginal flanges,
  (e) a second arcuate spring clip engaging at one end a second of said hooks and looped around an edge of a second of said plates with the outer surface of said second clip bearing against a second face of said central flange and extending at the other end to the face of a second of said plates opposite a second of said marginal flanges, and (f) a channel member of width corresponding with the width of said bar having a pair of flanges on the extremities thereof engaging the other end of both clips and the surfaces of said plates.

4. The combination set forth in claim 3 in which said bar is a hollow, rectangular extrusion in which said marginal flanges have opposed outer surfaces coplanar with opposed surfaces of said extrusion and said central flange is located between and extending parallel with said marginal flanges.

5. A spring clip for a structural frame assembly which comprises:

(a) a spring strap of arcuate form extending approximately 270° having rolled, hook-shaped ends in section, at least one of which is rolled inwardly of the arc formed by said strap thereby to form an inwardly directed hook, and (b) a resilient tongue formed from an intermediate portion thereof and extending outwardly and then parallel to the perimeter of the body of said clip at said intermediate portion.

6. The combination set forth in claim 5 in which the base of said tongue is adjacent to the end of said clip which is rolled inwardly.

7. A system for sealing an opening having a sash for supporting a glass plate and a sash strip hook directed away from the plane of said plate with a sash base flange extending perpendicular to the plane of said plate adjacent the edge thereof to a stop-line on the side of said plate opposite said hook which cmprises:

(a) a spring clip of arcuate form and having rolled hook-shaped ends one of which engages said sash hook and the other end of which engages the surface of said plate opposite said sash hook, (b) said clip having a resilient tongue formed from an intermediate portion thereof extending downwardly to said sash base flange and then approximately parallel to the perimeter of the body of said clip at said intermediate portion, and (c) a facing channel having a base side flange terminating in a wedge rib tip of inner configuration corresponding with the downwardly extending portion of said tongue and a finish side flange having a base directed tip for engaging said plate and the end of said clip opposite said sash hook.

8. A system for sealing an opening having a sash for supporting a glass plate and a sash strip hook directed away from the plane of said plate with a sash base flange extending perpendicular to the plane of said plate adjacent the edge thereof to a stop-line on the side of said plate opposite said hook which comprises:

(a) a spring clip of arcuate form and having rolled hook-shaped ends one of which engages said sash hook and the other end of which engages the surface of said plate opposite said sash hook, (b) said clip having a resilient tongue formed from an intermediate portion thereof extending downwardly to said sash base flange at a point a predetermined distance from said stop-line and between said stop-line and the plane of said plate and then sloping away from said sash base flange approximately parallel to the perimeter of the body of said clip at said intermediate portion, (c) a facing channel, (d) a base side flange on said channel terminating in a wedge rib sloping away from said sash base flange along a line corresponding with said predetermined distance and of configuration corresponding with the downwardly extending portion of said tongue, and (e) a finish side flange on said channel having a base directed tip for engaging said plate and the end of said clip opposite said sash hook.

9. A system for sealing an opening having a sash for supporting a glass plate and a sash strip hook directed away from the plane of said plate with a sash base flange extending perpendicular to the plane of said plate adjacent the edge thereof to a stop-line on the side of said plate opposite said hook which comprises:

(a) a spring clip of arcuate form and having rolled hook-shaped ends one of which engages said sash hook and the other end of which engages the surface of said plate opposite said sash hook, (b) said clip having a resilient tongue formed from an intermediate portion thereof extending downwardly from said sash hook to said sash base flange and then approximately parallel to the perimeter of the body of said clip at said intermediate portion, (c) a facing channel with the base side flange on said facing channel inset from the edge of said channel a distance at least equal the thickness of said sash base flange and terminating in a wedge-shaped rib which is peaked at a distance from the inner face of said channel a distance corresponding with the location of the base of said tongue and of inner configuration corresponding with the downwardly extending portion of said tongue to engage said tongue and maintain the edge of said channel in abutting concealing relation at the edge of said sash base flange, and (d) a finish side flange on said facing channel having a resilient sealing strip mounted therein and having a base directed tip portion for engaging said plate and the end of said clip opposite said sash hook to maintain said sealing strip in contact with the face of said plate.

10. A system for sealing an opening having a sash for supporting a glass plate and a sash strip hook directed away from the plane of said plate with a sash base flange extending perpendicular to the plane of said plate adjacent the edge thereof to a stop-line on the side of said plate opposite said hook which comprises:

(a) a spring clip of arcuate form extending approximately 270° having rolled, hook-shaped ends in section, at least one of which is rolled inwardly of the arc formed by said clip thereby to form an inwardly directed sash hook, (b) said clip having a resilient tongue formed from an intermediate portion thereof extending downwardly to said sash base flange at a point a predetermined distance from said stop-line and between said stop-line and the plane of said plate and then sloping away from said sash base flange approximately parallel to the perimeter of the body of said clip at said intermediate portion, (c) a facing channel, (d) a base side flange on said channel terminating in a wedge rib sloping away from said sash base flange along a line corresponding with said predetermined distance and of configuration corresponding with the downwardly extending portion of said tongue, and (e) a finish side flange on said channel having a base directed tip for engaging said plate and the end of said clip opposite said sash hook.

References Cited by the Examiner

UNITED STATES PATENTS

| | | | |
|---|---|---|---|
| 2,268,269 | 12/1941 | Toney et al. | 20—56.4 |
| 2,620,905 | 12/1952 | Hallauer | 189—78 |
| 2,757,421 | 8/1956 | Toney | 20—56.4 |
| 2,871,524 | 2/1959 | Wille et al. | 20—56.4 |
| 2,882,561 | 4/1959 | Shrode | 20—56.4 |

HARRISON R. MOSELEY, *Primary Examiner.*

W. E. HEATON, *Examiner.*